United States Patent
Li et al.

(10) Patent No.: US 7,564,847 B2
(45) Date of Patent: *Jul. 21, 2009

(54) FLOW ASSIGNMENT

(75) Inventors: Yunhong Li, San Diego, CA (US); Abhijit S. Khobare, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 588 days.

This patent is subject to a terminal disclaimer.

(21) Appl. No.: 11/011,800

(22) Filed: Dec. 13, 2004

(65) Prior Publication Data

US 2006/0126628 A1  Jun. 15, 2006

(51) Int. Cl.
*H04L 12/28* (2006.01)
*H04L 12/56* (2006.01)

(52) U.S. Cl. ............... 370/392; 370/395.2; 370/395.32
(58) Field of Classification Search ............ 370/389, 370/392, 395.2, 395.3, 395.31, 395.32
See application file for complete search history.

(56) References Cited

U.S. PATENT DOCUMENTS

| | | | | |
|---|---|---|---|---|
| 6,195,351 | B1 * | 2/2001 | Hiscock et al. | 370/389 |
| 6,629,195 | B2 * | 9/2003 | Schroeder et al. | 711/108 |
| 6,661,794 | B1 * | 12/2003 | Wolrich et al. | 370/394 |
| 6,952,824 | B1 | 10/2005 | Hooper et al. | |
| 7,248,586 | B1 * | 7/2007 | Hughes et al. | 370/394 |
| 7,292,589 | B2 * | 11/2007 | Dhara | 370/401 |
| 7,299,266 | B2 * | 11/2007 | Boyd et al. | 709/213 |
| 2003/0081615 | A1 * | 5/2003 | Kohn et al. | 370/395.42 |
| 2005/0015773 | A1 * | 1/2005 | Gorman et al. | 719/310 |
| 2005/0111355 | A1 | 5/2005 | Plaks et al. | |

FOREIGN PATENT DOCUMENTS

WO  2006065691 A1  6/2006

OTHER PUBLICATIONS

Rutsche: The Architecture of a Gb/s Multimedia Protocol Adapter; Computer Communication Review; ACM SIGCOMM; pp. 59-68.
Intel: Addressing TCP/IP Processing challenges Using the IA and IXP Processors; Intel Technology Journal, Communications Processing vol. 07, Issue 04; Nov. 14, 2003.
Intel: Intel IXP2400 Network Proessor; Hardware Reference manual; Nov. 2003; 408 pages.
PCT/US2005/044774 Int'l Search Report & Written Opinion dated Apr. 27, 2006.
International Preliminary Report on Patentability for PCT Application No. PCT/US2005/044774, Mailed Sep. 12, 2005, 6 Pages.

* cited by examiner

*Primary Examiner*—Ronald Abelson

(57) ABSTRACT

In general, in one aspect, the disclosure describes assigning a flow of network packets to a thread of a multi-threaded processor core in a set of multiple multi-threaded processor cores integrated on a single die. Based on the assigning, a packet in the flow is processed by the assigned processor core thread.

20 Claims, 8 Drawing Sheets

FLOW ASSIGNMENT

BACKGROUND

Networks enable computers and other devices to communicate. For example, networks can carry data representing video, audio, e-mail, and so forth. Typically, data sent across a network is carried by smaller messages known as packets. By analogy, a packet is much like an envelope you drop in a mailbox. A packet typically includes payload and a header. The packet's payload is analogous to the letter inside the envelope. The packet's header is much like the information written on the envelope itself. The header can include information to help network devices handle the packet appropriately.

A number of network protocols (e.g., "a protocol stack") cooperate to handle the complexity of network communication. For example, a transport protocol known as Transmission Control Protocol (TCP) provides applications with simple mechanisms for establishing a connection and transferring data across a network. Transparently to the applications, TCP handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. Frequently, an IP datagram is further encapsulated by an even larger packet such as an Ethernet frame. The payload of a TCP segment carries a portion of a stream of data sent across a network by an application. A receiver can restore the original stream of data by reassembling the received segments. To permit reassembly and acknowledgment (ACK) of received data back to the sender, TCP associates a sequence number with each payload byte.

The current state for each TCP connection is stored in a block of data known as a Transmission Control Block (TCB). The TCB includes data such as the next expected sequence number, the last sequence number transmitted, and so forth. A connection's TCB is typically read and, potentially, updated with each TCP segment received and transmitted.

Networks.

DETAILED DESCRIPTION

As described above, TCP (Transmission Control Protocol) implementations generally maintain state data for each ongoing connection ("flow"). This state data is, generally, accessed for every TCP segment processed. The memory operations used to access this data can slow system performance due to the time it takes to read and write the state data to memory. Additionally, in systems that employ multiple processing cores to process TCP segments, the state data can cause a performance bottleneck as the different elements vie for access. For example, packets belonging to the same flow may be handled by different cores, leaving one core to wait for access to the flow's state data until the other core completes its processing.

Figure 1:
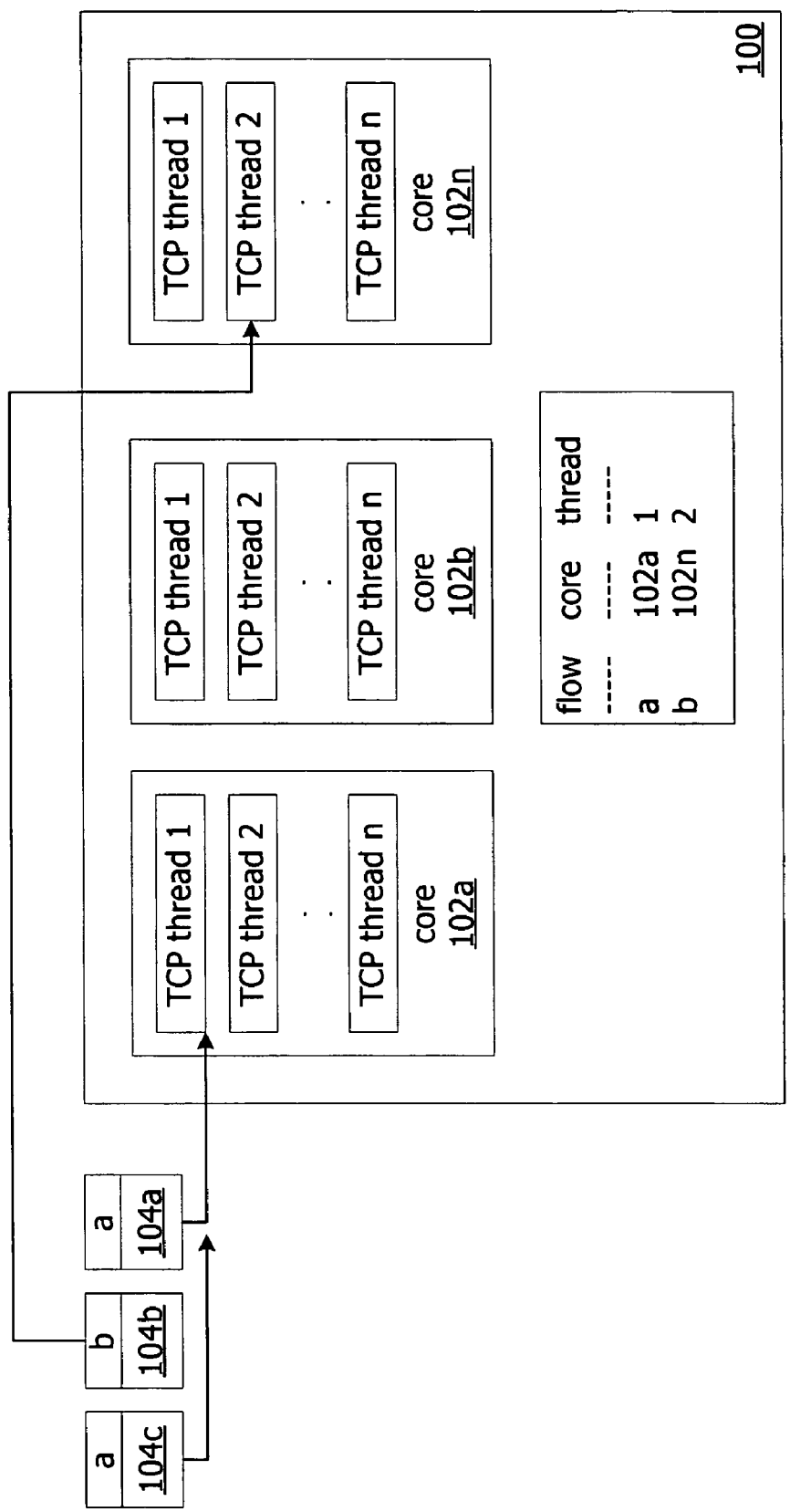
FIG. 1 is a diagram illustrating flow assignment.

FIG. 1 depicts operation of a scheme that assigns packet flows to different threads executing on cores $102a$-$102n$. For example, as shown, flow "a" is assigned to thread "1" of core $102a$ while flow "b" is assigned to thread "2" of core $102n$. Packets belonging to these flows are processed by the assigned core $102a$-$102n$ thread. For example, packets $104a$ and $104c$ belonging to flow "a" are processed by thread "1" of core $102a$ while packet $104b$ is processed by assigned thread "2" of core $102n$. By processing packets belonging to the same flow on the same core/thread, a variety of contention and access delays can be avoided. For example, a TCB for a given flow can be stored in local core memory instead of being repeatedly read from/written to memory external to the core. Additionally, since contention across cores for a given flow's TCB is eliminated, latencies associated with locking can be avoided.

For ease of illustration, FIG. 1 arbitrarily labeled the flows "a" and "b". In practice, the flow of a given packet can be identified by a tuple of data included in the IP header and encapsulated TCP header of an IP datagram. For example, a flow may be identified by a combination of the IP source and destination addresses and the source and destination ports. The tuple may be hashed (e.g., by a CRC (Cyclic Redundancy Check) algorithm) to yield a sequence of bits ("a flow signature") identifying the flow.

FIGS. 2A-2D depicts a sample implementation of a multi-core system that makes flow assignments. In this implementation, the cores $102b$-$102n$ provide a pool of TCP threads to process TCP segments. Each TCP thread can independently process a TCP segment. This processing can include segment reassembly, navigation of the TCP state machine for the flow, generating ACK messages, managing transmission windows, and so forth.

In this sample implementation, logic implementing flow assignment includes global classify 110 instructions that assign flows to cores $102b$-$102n$ and, thereafter, distribute packets belonging to these flows to the assigned cores $102b$-$102n$. To perform these operations, the global classify 110 instructions access data 114 that associates a flow with a given core $102b$-$102n$. For example, in FIG. 2A, flow "a" is assigned to core $102b$. In addition to this assignment, the data 114 associates a reference count ("ref. count") with a given flow that identifies how many packets in the flow have been scheduled for processing by the assigned core. The data 114 also associates the flow with a "completed" count indicating how many of these scheduled packets have already been completely processed. If all scheduled packets have been processed, the flow's entries may be victimized. For example, periodically a thread may subtract a flow's "completed" count from its "reference count". If the result is zero, indicating all scheduled packets have been processed, the flow data may be eliminated from data 114. Otherwise, the "completed" count is zeroed and the existing assignment for the flow remains intact.

In addition to the global classify 110 logic, the sample implementation also features local classify $112b$-$112n$ instructions executing on each core $102b$-$102n$ providing TCP threads. It should be noted that $112b$-$112n$ are instantiations of the same local classify logic for each core $102b$-$102n$. Once the global classify 1110 logic schedules a packet for processing by an assigned core $102b$, the local classify $112b$-$112n$ logic operating on that core $102b$ determines the particular thread assigned to a flow. To perform this task, the local classifier $112b$ can access local data $116b$ associating a flow with a given thread. Thus, the global 110 and local classify 112b logic route a datagram for processing with increasing granularity. That is, the global classify 110 logic can queue a datagram to the assigned core 102b, while the local classifier 112b queues the datagram to a particular thread within the core 102b.

Figure 2A:
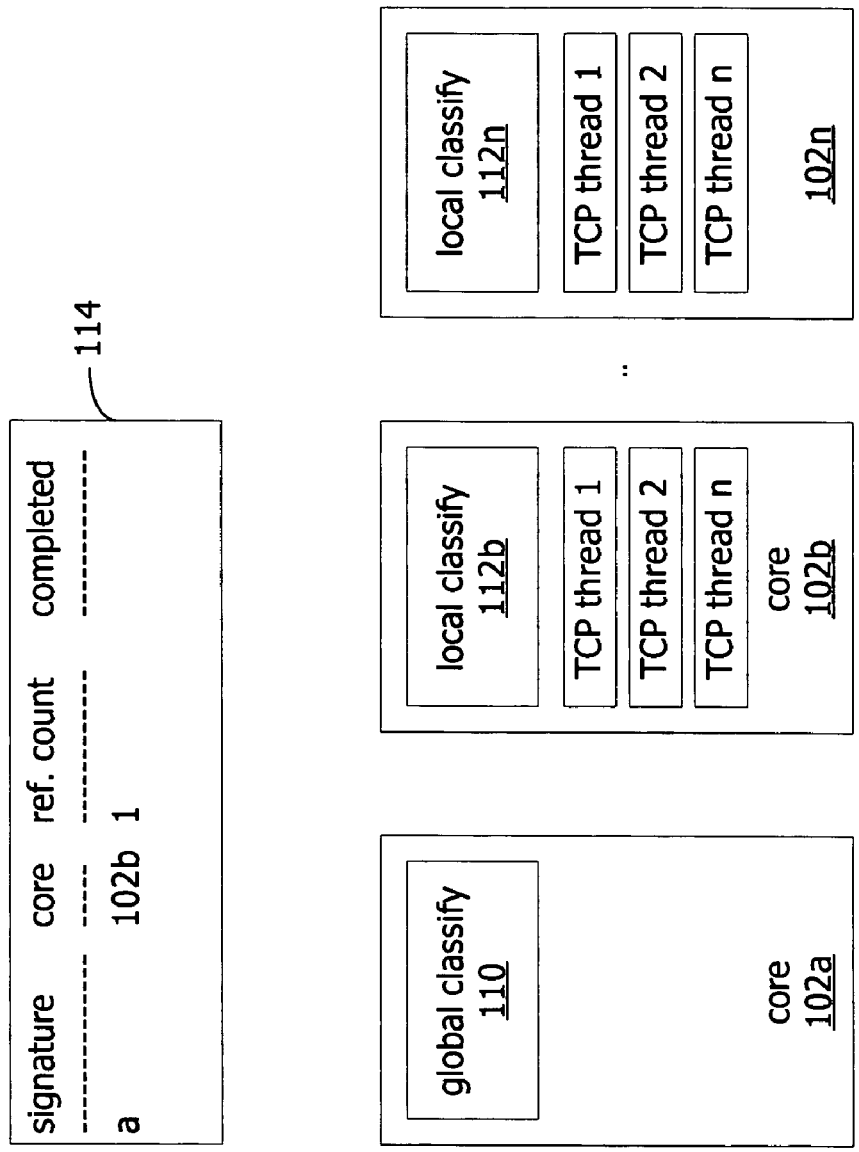
FIG. 2A-2D are diagrams illustrating operation of a sample scheme to assign flows.
Figure 2B:
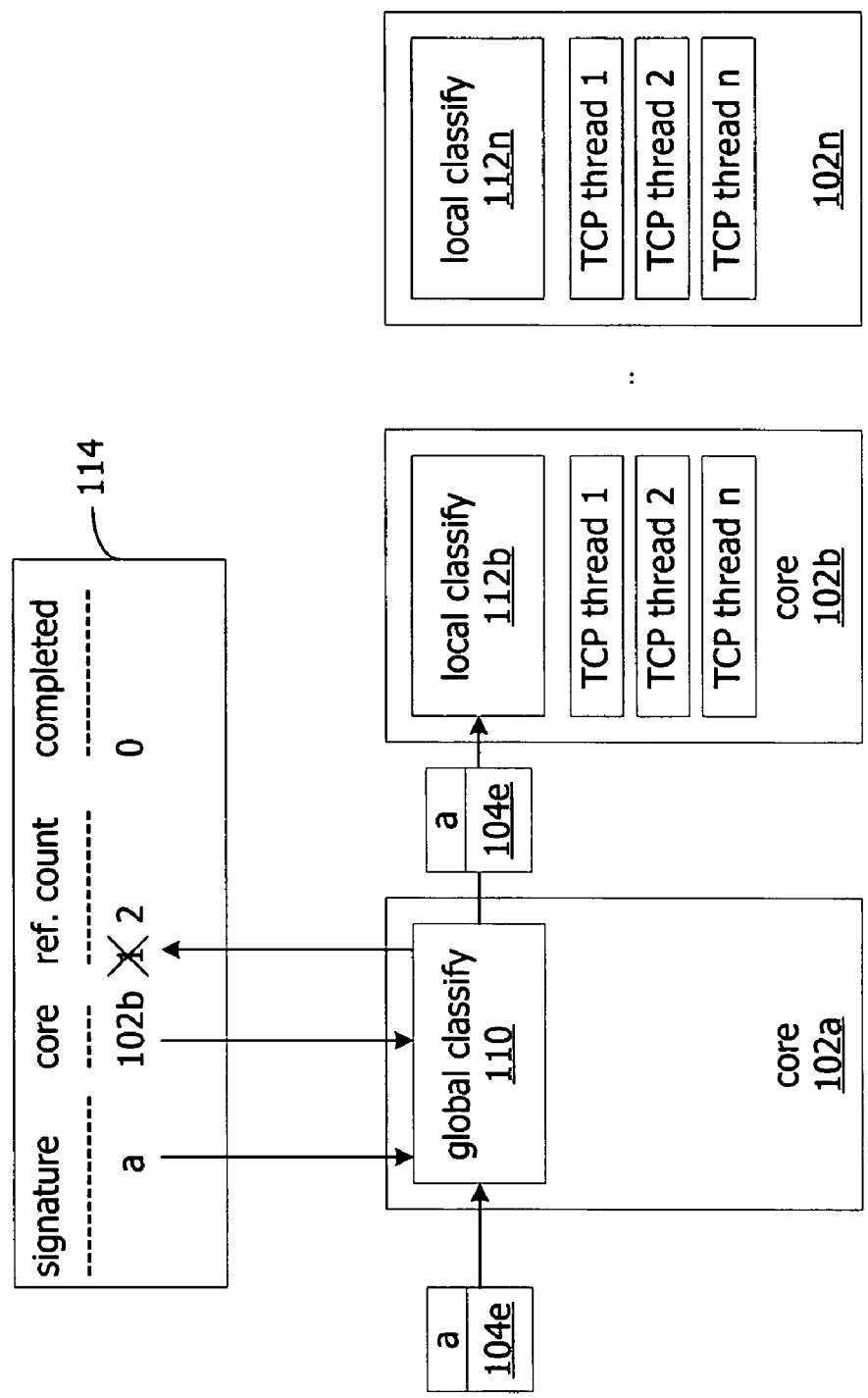
Figure 2C:
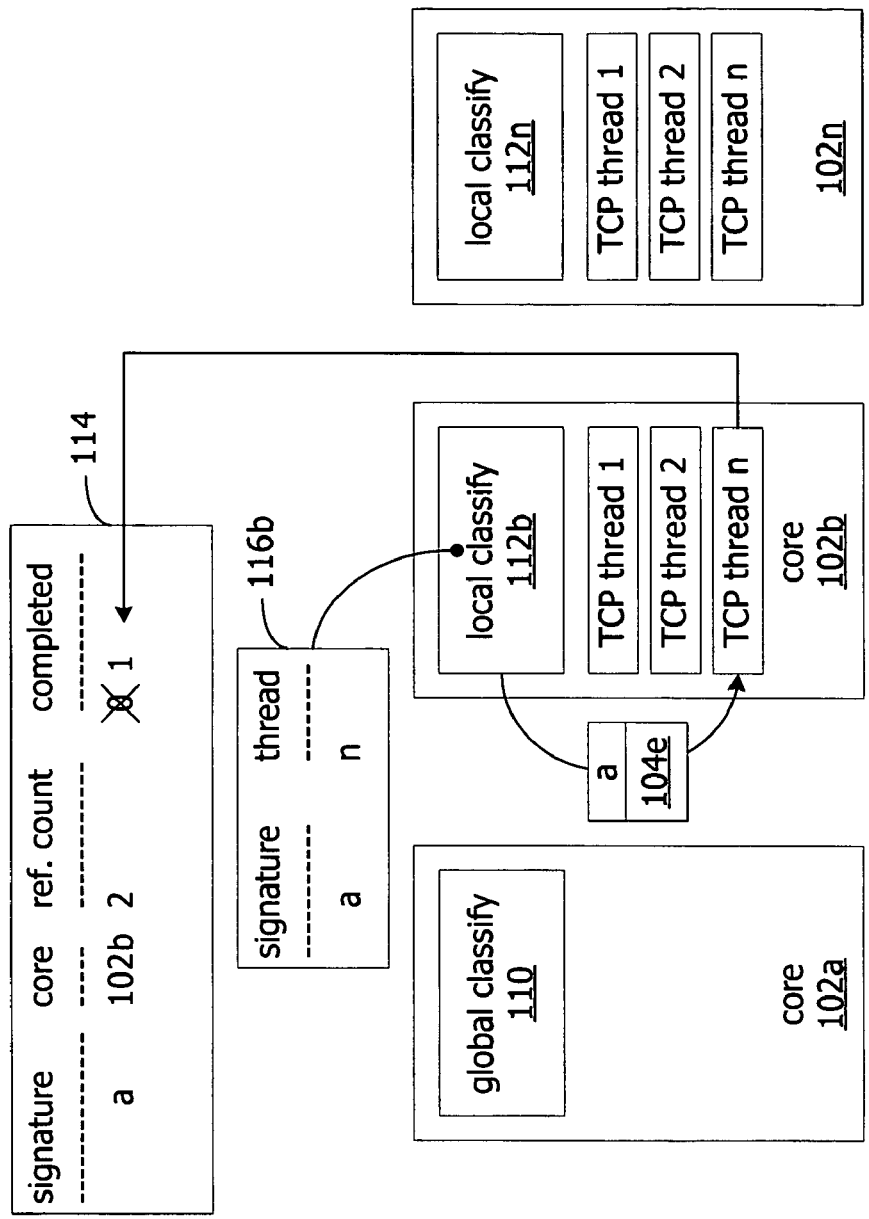

To illustrate sample operation of these elements, FIGS. 2B-2C depict handling of an IP datagram 104e encapsulating a TCP segment. As shown in FIG. 2B, after receiving the datagram 104e, the global classify 110 logic attempts to lookup the datagram's 104d flow signature ("a"). In this example, the lookup for flow "a" succeeded, the assigned core ("102b") is retrieved, the global classify 110 logic queues the datagram 104e for processing by the assigned core 102b, and the reference count for the flow is incremented to reflect scheduling of the packet 104e for processing by core 102b. While FIG. 2B depicts the actual packet being queued to the core, the global classify 110 and local classify 112b logic may operate on packet references/handles to avoid copying packet data.

As shown in FIG. 2C, the local classifier 112b on the assigned core 102b eventually dequeues the datagram 104e and determines the thread assigned to process the flow's datagrams. The assigned thread then performs TCP processing on the segment. In its operations, the thread may use local core memory to cache a copy of the flow's TCB from memory (not shown). This copy may be modified by the TCP thread and other threads of the core for the current packet and subsequently received packets in the flow. As shown, after completing processing for a given datagram, the thread increments the "completed" count for the flow.

The thread continues to dequeue and process queued datagrams for the flow. Eventually, the TCB for the flow is written back to memory, for example, after the thread has emptied its queue. Thus, this implementation ensures that flow state data remains in local core memory for "back-to-back" packets (i.e., a packet is scheduled for processing by a thread before the thread has completed processing of a previous packet in the flow), avoiding a costly write and read of the flow's state data to/from external memory.

The scenario illustrated in FIGS. 2B-2C assumed prior assignment of flow "a". However, often, a flow may not have a current assignment. In this event, the global classify 110 logic flow lookup for a packet will fail. At this point, the global classify 110 logic may make an initial flow assignment by writing data 114 associating the flow with the assigned core. Assignment of a flow may be implemented in a variety of ways to load balance flows across cores (e.g., by using a round-robin among cores) or provide different qualities of service. After assignment of a flow to a given core, the selected core can assign an available thread to process the flow.

Figure 2D:
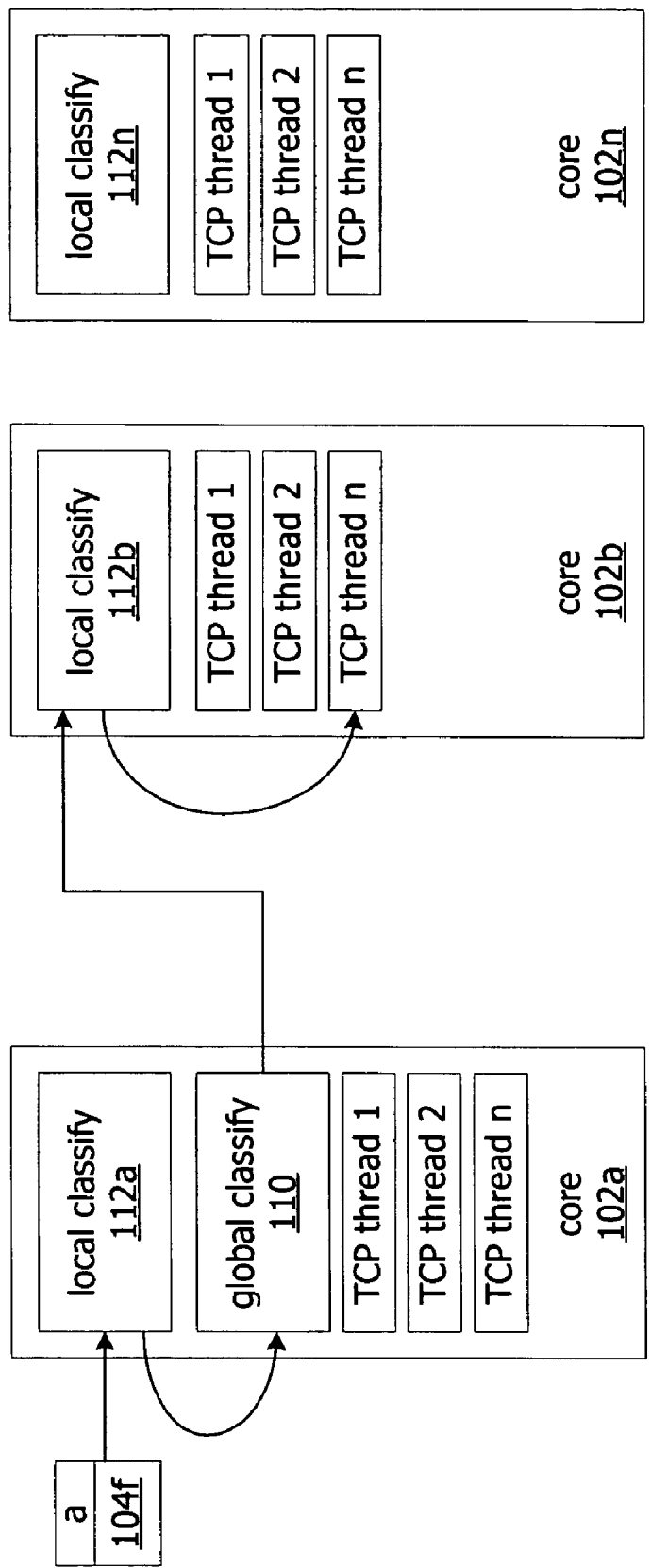

Potentially, as shown in FIG. 2D, a core 102a executing the global classify 110 logic may also provide TCP threads and execute a local classifier 112a. In such an implementation, a received packet may initially be processed by the core's 100a local classifier 112a. In the event the local classifier 112a succeeds in identifying a assigned thread n for the received packet, it queues the packet to that thread n. In the event the local classifier 112a does not succeed in identifying an assigned thread, the global classifier 114 then executes. For example, as shown, assuming flow "a" is still assigned to thread "n" of core 102b, packet 104f would initially be handled by local classifier 112a of core 102a. Since local classifier 102a would not store a local thread assignment for the packet's 104f flow, local classifier 102a would pass the packet to global classifier 110. At this point, the sequence of processing would remain the same as shown in FIG. 2C. That is, the global classifier 110 will queue packet 104f for handling by the local classifier 112b of core 102b which, in turn, queues the packet 104f for processing by thread "n".

In such an implementation, the global classifier 110 may assign a thread to the core 102a executing the global classifier 110. In this case, the global classifier 110 can assign the flow to a thread on the core 102a by updating the flow/thread assignment data accessed by the core's 102a local classifier 112a. The global classifier 110 can then queue the packet for re-handling by the local classifier 112a.

Figure 3:
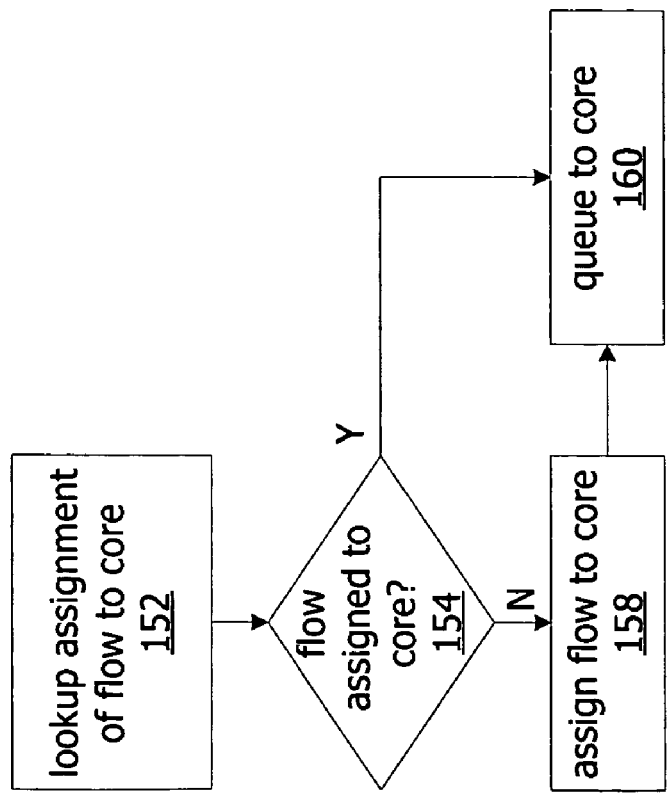

FIG. 3 illustrates a sample global classify process. As shown, the global classifier performs a lookup 152 of a datagram's flow signature to determine 154 if the flow had previously been assigned to a given core and/or thread. If not, the global classifier assigns 158 the flow to a core and/or thread. The datagram is then queued 160 for processing by the assigned core and/or thread.

Figure 4:
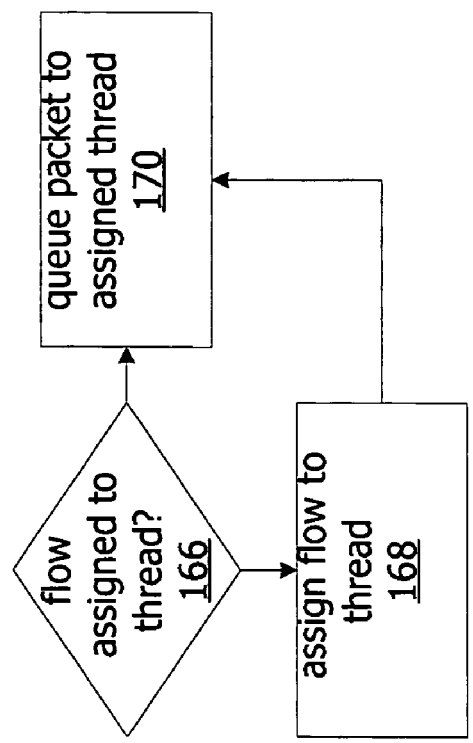
FIGS. 3-4 are flow-charts of sample processes to deliver packets based on their flow assignment.

FIG. 4 illustrates a sample local classify process. As shown, the local classifier attempts to determine 166 whether the flow of the queued datagram had been assigned to a thread on the core executing the local classifier. If so, the datagram is queued 170 for processing by that thread. Otherwise, the flow is assigned 168 to an available thread of the core (e.g., the currently executing thread).

In the scheme illustrated in FIGS. 2-4, the TCP thread processing segments in a given flow can retain the flow's TCB in local memory of the assigned core. Again, this can reduce latency associated with access contention between cores and accessing external memory.

The sample implementation shown in FIGS. 2-4 is, again, merely an example and other implementations may vary in design or operation. For example, while the data 114 used in the sample implementation is shown as a monolithic table, this data may be stored in separate tables to speed operation. For example, flow signatures may be separately stored to speed the determination of whether a given flow has a current assignment. For example, at least a portion of the signatures can be stored in a Content Addressable Memory (CAM) where a CAM "hit" quickly identifies a flow having a current assignment. Similarly, the "completed" count, incremented by the TCP threads, may be stored separately to reduce access contention between the TCP threads and the global classify logic 110. When stored separately, the different flow data may be associated by a table index (e.g., data associated with a flow is stored at the same relative position in the different tables).

Implementations of the techniques illustrated above may vary in their granularity. That is, instead of assigning a given flow to a particular thread a system may only assign a flow to a given core and let the threads operate on the segments based on availability. Further, in other implementations, the threads may feature a global thread ID that can be used by the global classify logic to directly enqueue a packet to the correct thread instead of the two-part scheme illustrated above.

Techniques described above may be implemented in a variety of multi-core devices such as a multi-core central processing unit (CPU) or network processor. For example, FIG. 4 depicts an example of network processor 200. The network processor 200 shown is an Intel® Internet eXchange network Processor (IXP). Other network processors feature different designs.

The network processor 200 shown features a collection of processing cores 202 on a single integrated semiconductor die. Each core 202 may be a Reduced Instruction Set Computing (RISC) processor tailored for packet processing. For example, the cores 202 may not provide floating point or integer division instructions commonly provided by the instruction sets of general purpose processors. Individual cores 202 may provide multiple threads of execution. For example, a core 202 may store multiple program counters and other context data for different threads. Individual cores 202 may feature local memory internal to the core. Individual cores 202 may also feature a CAM. A CAM may also be a resource shared by the different cores 202.

As shown, the network processor 200 also features at least one interface 202 that can carry packets between the processor 200 and other network components. For example, the processor 200 can feature a switch fabric interface 202 (e.g., a Common Switch Interface (CSIX)) that enables the processor 200 to transmit a packet to other processor(s) or circuitry connected to the fabric. The processor 200 can also feature an interface 202 (e.g., a System Packet Interface (SPI) interface) that enables the processor 200 to communicate with physical layer (PHY) and/or link layer devices (e.g., MAC or framer devices). The processor 200 also includes an interface 208 (e.g., a Peripheral Component Interconnect (PCI) bus interface) for communicating, for example, with a host or other network processors.

As shown, the processor 200 also includes other components shared by the cores 202 such as a hash core, internal scratchpad memory shared by the cores, and memory controllers 206, 212 that provide access to external memory shared by the cores. The network processor 200 also includes an additional processor 210 (e.g., a StrongARM® XScale® or Intel® Architecture (IA) core) that is often programmed to perform "control plane" tasks involved in network operations. The core processor 210, however, may also handle "data plane" tasks.

The cores 202 may communicate with other cores 202 via core 210 or other shared resources (e.g., external memory or scratchpad memory). The cores 202 may also intercommunicate via neighbor registers directly wired to adjacent core(s) 204.

Features of the network processor 200 can be used to implement flow assignment in a variety of ways. For example, the CAM's associated with each core 202 may be used to store assignment data used by a local classifier. For example, the first N-entries of a CAM may store the signatures of N-flows assigned to different core threads. In such an implementation the ordinal number of the CAM entry identifies the assigned thread (e.g., the flow signature stored in the second CAM entry identifies the second core thread as assigned to the flow).

The CAMs may also be used by the global classifier. For example, the last M-entries of a CAM of a core executing the global classifier may be used to store a subset of flow signatures of currently assigned flows (e.g., the signatures column of data 114 in FIGS. 2A-2C) to speed the initial signature lookup. Since the CAM(s) may not feature sufficient space for all the signatures of assigned flows, the remaining flow signatures and corresponding assignment data may be stored off-chip (e.g., in SRAM). Thus, a CAM miss for a signature causes the global classifier to perform a subsequent search of memory of the remaining signatures for a match.

The network processor 200 shown features a variety of mechanisms that can be used to route packets among the different cores 202. For example, a packet can be queued for processing by an assigned core via the next neighbor registers connecting adjacent cores or via queues implemented in memory (e.g., in scratchpad or SRAM). Similarly, queues for particular threads may be implemented in local core memory, scratchpad, SRAM, and so forth.

Potentially, the cores 202 may be programmed to implement a packet processing pipeline where threads operating on one or more core threads perform Ethernet operations (e.g., Ethernet receive, Ethernet de-encapsulation), IPv4 and/or IPv6 operations (e.g., verification), and threads on one or more cores handle TCP operation such. Other threads may implement application operations on the resulting data stream.

Figure 5:
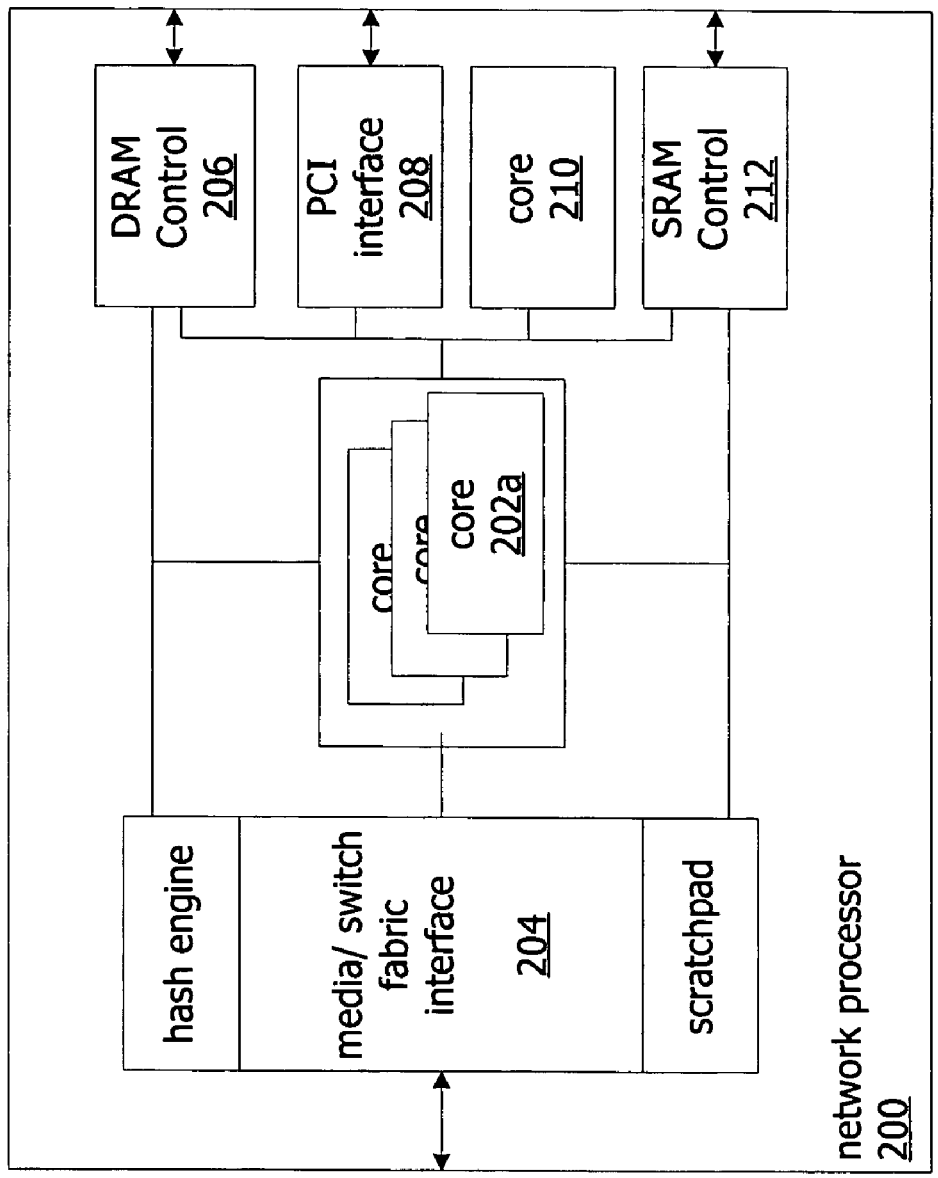
FIG. 5 is a diagram of a sample multi-core processor.
Figure 6:
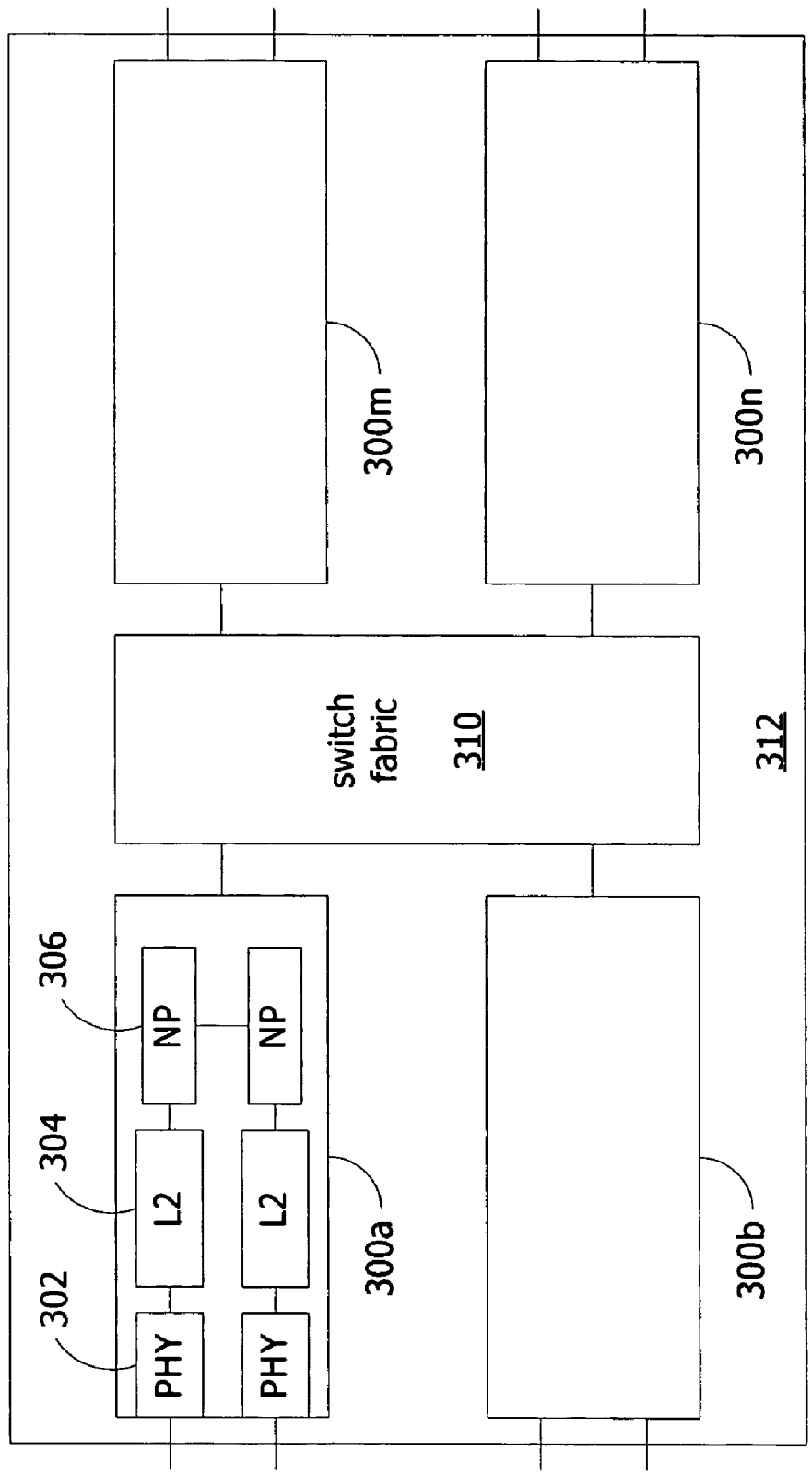
FIG. 6 is a diagram of a network device.

FIG. 5 depicts a network device that can process packets using techniques described above. As shown, the device features a collection of line cards 300 ("blades") interconnected by as with fabric 310 (e.g., a crossbar or shared memory switch fabric). The switch fabric, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual line cards (e.g., 300a) may include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown may also include one or more network processors 306 that perform packet processing operations for packets received via the PHY(s) 302 and direct the packets, via the switch fabric 310, to a line card providing an egress interface to forward the packet. Potentially, the network processor(s) 306 may perform "layer 2" duties instead of the framer devices 304.

While FIGS. 4 and 5 described specific examples of a network processor and a device incorporating network processors, the techniques may be implemented in a variety of architectures including processors and devices having designs other than those shown. For example, the techniques may be used in a multi-core TCP Offload Engine (TOE). Such a TOE may be integrated into a IP storage node, application ("layer 7") load balancer, or other devices.

Additionally, the techniques may be used to handle other transport layer protocol, protocols in other layers within a network protocol stack, protocols other than TCP and IP, and to handle other protocol data units. For example, the techniques may be used to handle other connection oriented protocols such as Asynchronous Transfer Mode (ATM) packets ("cells") or User Datagram Protocol (UDP) packets. Additionally, the term IP encompasses both IPv4 and IPv6 IP implementations.

The term circuitry as used herein includes hardwired circuitry, digital circuitry, analog circuitry, programmable circuitry, and so forth. The programmable circuitry may operate on executable instructions disposed on an article of manufacture (e.g., a non-volatile memory such as a Read Only Memory).

Other embodiments are within the scope of the following claims.

What is claimed is:

1. A method, comprising:
    assigning a flow of network packets to a thread of a multi-threaded processor core in a set of multiple multi-threaded processor cores integrated on a single die, the flow identified by a tuple of packet header fields comprising an Internet Protocol source address and an Internet Protocol destination address;
    based on the assigning, processing a packet in the flow by the assigned processor core thread.

2. The method of claim 1, wherein the packet comprises an Internet Protocol packet including a Transmission Control Protocol segment.

3. The method of claim 2, wherein the flow comprises a flow identified by, at least, the packet's Internet Protocol source address, Internet protocol destination address, Transmission Control Protocol segment source port, and Transmission Control Protocol segment destination port.

4. The method of claim 1, further comprising determining whether each packet in the flow that has been scheduled to be processed by the core thread has been processed.

5. The method of claim 1, further comprising reading data associated with the flow into a local memory associated with the processor core.

6. The method of claim 5, wherein the data comprises a Transmission Control Block (TCB) of a Transmission Control Protocol (TCP) connection.

7. The method of claim 1, further comprising:
determining at a first processor core, the processor core assigned to the flow;
determining at the assigned processor core one thread assigned to the flow from a set of threads provided by the assigned processor core.

8. The method of claim 1,
wherein the assigning the flow of the network packets to the thread of the multiple multi-threaded processor cores comprises:
assigning the flow of the network packets to a one of the set of multiple multi-threaded processor cores; and
at the assigned one of the multiple multi-threaded processor cores, assigning the flow to a one of multiple threads provided by the one of multiple multi-threaded processor cores.

9. The method of claim 8,
wherein the assigning the flow of network packets to the one of the multiple multi-threaded processor cores comprises assigning the flow at a first one of the set of multi-threaded processor cores;
wherein the assigned multi-threaded processor core comprises a second, different one of the set of multi-threaded processor cores for at least some packet flows.

10. The method of claim 9,
wherein the assigned multi-threaded processor comprises the first one of the set of multiple multi-threaded processor cores for at least some of some packet flows.

11. The method of claim 9, further comprising:
in response to receipt of a packet, incrementing a packet count for the packet's flow by the first one of the set of multiple multi-threaded processor cores;
in response to processing the packet, decrementing the packet count for the packet's flow by the second, different one of the set of multiple multi-threaded processor cores; and
deleting an assignment for a flow by the first one of the set of multiple multi-threaded processor cores based on the packet count.

12. An article of manufacture, comprising instructions for causing a multi-core processor to:
assign a flow of network packets to a thread of a multi-threaded processor core in a set of multiple multi-threaded processor cores integrated on a single die, the flow identified by a tuple of packet header fields comprising an Internet Protocol source address and an Internet Protocol destination address; and
based on the assignment, process a packet in the flow by the assigned processor core thread.

13. The article of claim 12, wherein the packet comprises an Internet Protocol packet including a Transmission Control Protocol segment.

14. The article of claim 12, further comprising instructions to determine whether each packet in the flow that has been scheduled to be processed by the core thread has been processed.

15. The article of claim 12, further comprising reading data associated with the flow into a local memory associated with processor core.

16. The article of claim 15, wherein the data comprises a Transmission Control Block (TCB) of a Transmission Control Protocol (TCP) connection.

17. The article of claim 12, further comprising instructions to:
determine at a first processor core, the processor core assigned to the flow;
determine at the assigned processor core one thread assigned to the flow from a set of threads provided by the assigned processor core.

18. An apparatus, comprising:
multiple multi-threaded processor cores integrated on a single die; and
instructions to cause at least some of the multiple multi-threaded processor cores to:
assign a Transmission Control Protocol/Internet Protocol (TCP/IP) flow to a one of the threads of the processor cores; and
based on the assignment, process a TCP segment in the flow by the assigned processor core thread.

19. The apparatus of claim 18,
wherein the processor comprises at least one Content Addressable Memory; and
wherein the instructions to assign the TCP/IP flow to the one of the threads comprises instructions to write a flow identifier into the at least one Content Addressable Memory.

20. A method, comprising:
receiving Internet Protocol packets encapsulating respective Transmission Control Protocol segments, the received Internet Protocol packets having respective packet flow identifiers, each of the respective packet flow identifiers comprising a tuple formed by, at least, Internet Protocol source address and destination address header fields of the respective Internet Protocol packets; and
distributing the respective Internet Protocol packets to respective threads assigned to respective packet flows for, at least, Transmission Control Protocol processing of the Transmission Control Protocol segments encapsulated within the respective Internet Protocol packets, the threads being from a set of multiple threads provided by multiple cores integrated on a die, different respective cores providing different respective ones of the respective threads assigned to respective packet flows;
wherein the distributing comprises:
determining respective hash values for the respective Internet Protocol packets based on respective hashes of, at least, the Internet Protocol source address and destination address of the respective Internet Protocol packets;
performing respective lookups in a Content Addressable Memory (CAM) of the respective hash values for the respective Internet Protocol packets; and
determining the respective assigned threads based on the respective lookups.

* * * * *